May 29, 1951  L. SCHARFE  2,554,960
DENTAL FLASK
Filed Nov. 2, 1949

INVENTOR.
LEO SCHARFE.
BY Howard J. Whelan.
ATTORNEY.

Patented May 29, 1951

2,554,960

UNITED STATES PATENT OFFICE 2,554,960

DENTAL FLASK

Leo Scharfe, Baltimore, Md.

Application November 2, 1949, Serial No. 125,047

4 Claims. (Cl. 18—33)

This invention relates to dental equipment and more particularly to the molding operations involved during the making of dental restorations and the flasks used therewith.

The manufacture of a dental plate requires, under conventional practice, the taking of an impression of the oral cavity in a special composition or plaster of Paris, held in a metal tray suitably designed for convenient placement in and removal from the cavity. After that, several steps in the process require the use of this impression to produce a wax model of it. Then comes the addition of the teeth in correct alignment therein, followed by the casting of plaster of Paris about the model, set in a molding flask. The making of the finished denture continues from the last step, with the removal of the wax of the model by melting, leaving the teeth held in the plaster mold material. Then the empty space left is used for the insertion and packing of the plastic material therein to make the denture. The molded plastic material with the teeth set in it in a flask, is then cured and/or vulcanized. The vulcanized plate and teeth which is encased and set in the plaster is removed with considerable difficulty by sawing the plaster into sections and breaking such apart. The sections of plaster of Paris are then removed in sections and the residue they leave is scraped out manually. The objection to the last operation is that it requires the use of small expensive saws that break easily, and the skill involved is considerable. If the sawing is not done carefully, the plate and teeth are apt to be sawed into or broken and ruined. This requires a repetition of the process for the making of a new plate. This takes time, effort and increases the cost of manufacture considerably. In this invention, a molding flask is used that holds the denture securely and effectively during the process of curing and/or vulcanizing, but when the removal of the finished plate is made, enables the latter to be broken out of the plaster mold easily, quickly and without danger to the plate. This diminishes the cost and time in making the plate and tends to produce a better article.

It is therefore an object of this invention to provide a new and improved molding flask for dental restorations manufacture or orthodontia that will avoid one or more of the disadvantages and limitations of the prior art.

Another object of this invention is to provide a new and improved molding flask using plaster of Paris or materials of similar nature that will permit facile removal of the molded contents.

A further object of the invention herein described is to provide a new and improved molding flask for dental plates that will enable the article made therein to be broken out of the mold with the least amount of effort and trouble.

An additional object of the invention is to provide a new and improved flask that can be separated into sections that will allow access to and removal of the molding material.

Other objects will become apparent as the invention is outlined more in detail.

For a better understanding of the invention, and the objects thereof, reference is made to the appended drawings. These drawings together with the following description outline a particular form of the invention by way of example, and explain its principles, while the claims emphasize the scope thereof.

In the drawings.

Similar reference characters refer to the same parts in all the drawings.

Figure 1:
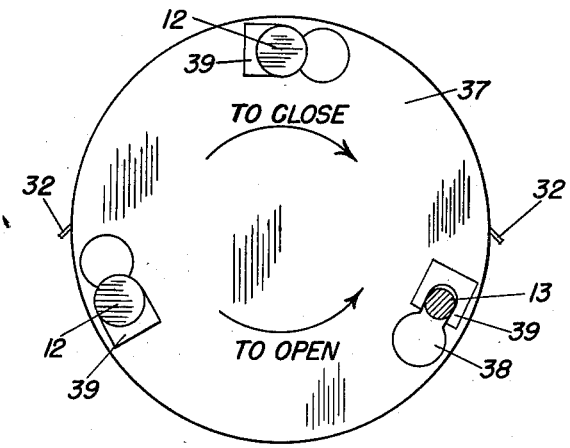
Figure 1 is a plan view of a dental flask unit embodying this invention.
Figure 4:
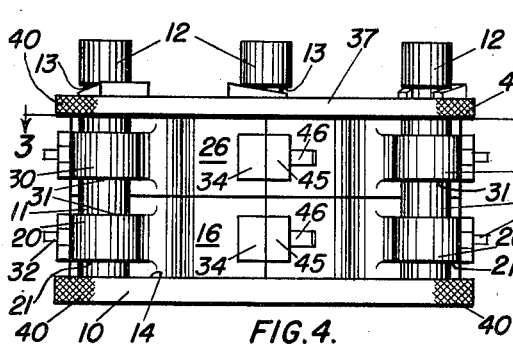
Figure 4 is a side elevation of the flask, 120 degrees from the position shown in Figure 2.
Figure 2:
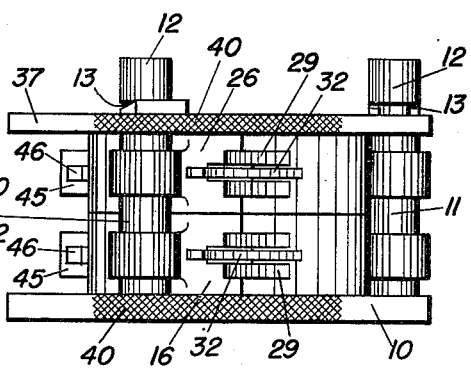
Figure 2 is a side elevation of the flask shown in Figure 1.
Figure 3:
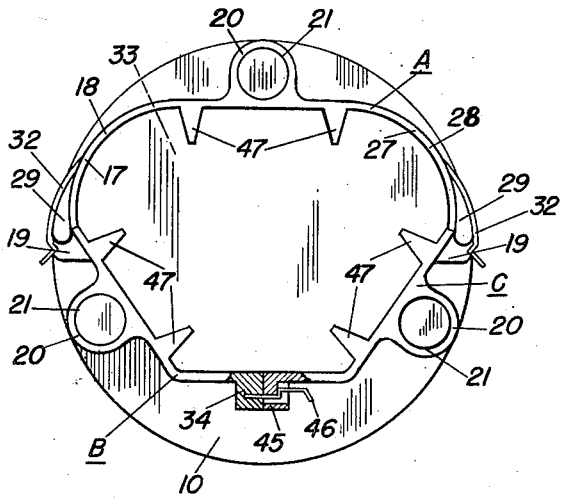
Figure 3 is a section view on the line 3—3 of Figure 2.

In the construction shown, a flask unit for use in the manufacture of dental restorations is indicated and comprises several sections which, for the sake of brevity, will hereinafter be referred to, separately and severally, as flask. It has a flat circular base 10, from which extend three posts 11 at 120° apart, perpendicular to one side surface 14. These studs have circular heads 12 with their under surfaces 13 under cut to provide a wedge tightening action. Loosely resting on the upper surface 14 of the base, is a flask 16. This flask has an outline conforming in general to the contour of the article to be held or molded therein. Its inside and exterior wall surfaces 17 and 18 respectively are flat and rise vertically above the base. The walls on their exterior are provided with spaced lugs 20 through the holes 21 of which the studs 11 extend when the flask is located on the base. A similar flask 26 is provided with its interior and exterior surfaces 27 and 28 respectively flat and alignable with those of the flask 16, when placed directly above the first described flask. It also has lugs 30 with holes 31 therethrough to register with the studs 11. Each flask 16 and 26 is divided up into three sections, A, B and C. The sections are joinable to one another in a vertical or transverse plane by a tongue and socket arrangement. The tongues 19 on B and C are insertable into the sockets 29 of A and there retained in place by a spring catch 32. The arrangement is on the outside surfaces of the sections so they will not interfere with the use of the molding material inside the flask. The sections B and C are joined together by having their respective lugs 34 and 45 fitted closely against each other and held by a catch 46. These sections are held together by this arrangement in a secure manner but such that they may be readily separated.

On the interior surfaces of the flasks are inwardly protruding wedge-like ribs 47 transversely arranged across their walls. These ribs become embedded in the plaster of Paris used in the molds when it is poured therein. On removal of the separated sections A, B and C, the ribs 47 being tapered, draw readily away from the plaster and leave the latter with indentations that permit easy breaking away of the plaster without the use of saws or the like.

The flasks 16 and 26 are mounted over one another on the base and held aligned by the studs 11. To complete the unit, a top or cover plate 37 of disc-like contour and similar in general to the base is placed on the upper flask 26. The plate 37 has an elongated slot 38 with an enlarged end alignable with the openings with the holes 21 and an opposite smaller end as clearly shown in Figure 1 to allow the studs 11 to pass through the larger dimension of the slot and to permit a partial rotative movement to be made towards the smaller dimension of the slot, so its wedge-like ridges 39 will ride under the heads 12 of the studs 11 and provide pressure to keep the plate 37, and flasks 16 and 26, tight against each other and the base 10. In this way no tools are required to put the elements of the unit together or in operation. However the peripheries of the base 10 and the top plate 37 may be knurled at 40 to facilitate handling them.

The unit has the advantages of being easily disassembled and its sections separated. It has no bolts or other means requiring tools, as arise in conventional practice. It eliminates the usual sawing of the molding material to get at the dental plate article cast or vulcanized by forming it into a readily broken structure in the flasks. The removal of the flask sections opens up the plaster of Paris material so it will readily break apart and expose the cast article and in doing so avoids injuring it. This is a great time saver. It eliminates the need of expensive saw blades now required, and articles are surer of being brought out of the flask in better condition than the usual methods used at the present time. In other words considerable wasted effort is avoided.

The manner of inserting the article to be vulcanized and other steps in the processes used are assumed to be known to those skilled in the art and therefore are not detailed at length herein. The manner of operating the parts or elements seems obvious. The catches holding the sections A, B and C are sprung apart by the use of the operator's fingers, to allow the tongue, sockets and lugs to unlock so the sections can be pulled away from each other, and from around the plaster of Paris. The top plate 37 is used to exert pressure by rotating it enough to wedge it down by pressing the ridges 39 under the heads 12 of the studs, and thereby keep the flasks tightly positioned together during the finishing processes of the unit on the article being cast. When the plaster with the vulcanized plate and teeth in it is to be removed, it has open V-like grooves across it that weaken it so the plaster may be broken on lines that they lead to. This breaking may be done in the hands of the operator and requires little effort.

While but one general form of the invention is shown in the drawings and described in the specifications, it is not desired to limit this application for patent to this particular form, as it is appreciated that other forms of construction could be made that would use the same principles and come within the scope of the appended claims.

Having thus described the invention, what is claimed is:

1. A dental flask comprising a plurality of superposed sections, a circular base for said sections, a top plate for said sections, said sections and plates having vertically aligned holes, a plurality of studs extending from said base through said holes, heads on said studs above said top plate having undercut faces, cam members on said top plate cooperating with said undercut faces, said top plate having an opening aligned with said holes and through which said studs extend, the said opening merging into an offset smaller opening, whereby said studs lock said undercut faces on said cam members by rotary movement of said top plate in said last mentioned opening, said base and top plate having an outer knurled periphery to permit rotary handling of the parts.

2. A dental flask as set forth in claim 1, said sections being formed of interlocked multiparts, and locking means between said parts.

3. A dental flask as set forth in claim 1, said sections being formed of interlocked multiparts and locking means between said parts, said means consisting of tongues carried by some of said parts and sockets carried by other of said parts and a spring catch yieldingly securing said parts.

4. A dental flask as set forth in claim 1, said sections having integral internally protruding tapered ribs extending into the material carried within the flask.

LEO SCHARFE.

REFERENCES CITED

The following references are of record in the file of this patent:

UNITED STATES PATENTS

| Number | Name | Date |
|---|---|---|
| 137,589 | Bailey | Apr. 8, 1873 |
| 250,513 | Finney | Dec. 6, 1881 |
| 258,858 | Locke | May 30, 1882 |
| 365,811 | Hawley | July 5, 1887 |
| 1,782,076 | Safford, Sr. | Nov. 18, 1930 |
| 1,962,410 | Rodin | June 12, 1934 |
| 1,972,238 | Reiffel | Sept. 4, 1934 |
| 2,030,524 | Lambert | Feb. 11, 1936 |
| 2,159,437 | Kirby | May 23, 1939 |
| 2,491,046 | Hora | Dec. 13, 1949 |